US006613408B1

United States Patent
Short

(10) Patent No.: US 6,613,408 B1
(45) Date of Patent: Sep. 2, 2003

(54) FUEL PERMEATION BARRIER FUEL TANK

(75) Inventor: William Thomas Short, Southfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 89 days.

(21) Appl. No.: 09/654,658

(22) Filed: Sep. 1, 2000

Related U.S. Application Data

(60) Provisional application No. 60/172,566, filed on Dec. 18, 1999.

(51) Int. Cl.[7] .................. B29D 22/00; B29D 23/00; B32B 1/08; B60P 3/00; B62D 33/00
(52) U.S. Cl. .................. 428/36.6; 428/35.7; 428/421; 428/422; 220/562
(58) Field of Search .................. 428/35.7, 35.9, 428/36.6, 36.91, 36.7, 35.2, 379, 389, 402, 421, 422; 220/562, 415, 456, 457; 206/524.1, 524.2, 524.3, 524.5

(56) References Cited

U.S. PATENT DOCUMENTS 3,645,834 A * 2/1972 McCaffrey .................. 161/92
5,129,544 A * 7/1992 Jacobaon et al. ........... 220/562
6,033,749 A * 3/2000 Hata et al. .................. 428/36.7

* cited by examiner

*Primary Examiner*—Harold Pyon
*Assistant Examiner*—Michael C. Miggins
(74) *Attorney, Agent, or Firm*—Vincent A. Cichosz

(57) ABSTRACT

A fuel permeation barrier fuel tank for a vehicle includes a tank shell having a wall formed from a plurality of layers. The layers include at least an inner layer, an outer layer, a fuel permeation barrier layer disposed between the inner layer and the outer layer, and a thermoformable layer disposed adjacent the outer layer to improve permeation resistance and protection against radiant environmental heating of the fuel tank.

14 Claims, 1 Drawing Sheet

FUEL PERMEATION BARRIER FUEL TANK

CROSS-REFERENCE TO RELATED APPLICATION (S)

The present invention claims the priority date of copending U.S. Provisional Patent Application Serial No. 60/172,566, filed Dec. 18, 1999.

TECHNICAL FIELD

The present invention relates generally to fuel tanks for vehicles and, more particularly, to a fuel permeation barrier fuel tank for a vehicle.

BACKGROUND OF THE INVENTION

It is known to provide a fuel tank such as a plastic fuel tank in a vehicle to hold fuel to be used by an engine of the vehicle. When a plastic fuel tank is made, a weld line is formed by the co-extrusion of a multi-layer parison and blow molding it to form the tank, or when sheets are co-extruded, vacuum formed into two shells, and welded together to form the tank. In most cases, one of the co-extruded layers is a material that acts as a barrier to prevent excessive permeation of fuel into the atmosphere. One concern with plastic fuel tanks is that exposure to sources of radiant heat could soften the walls, compromising the structural integrity of the fuel tank, or lead to excessive internal pressures by heating the fuel.

One commercial approach to resolve this concern is to thicken the barrier layers or add addition barrier layers in the walls of the fuel tank, which increases the weight, cost and reduces fuel capacity of the fuel tank. Another commercial approach is to protect the fuel tank by metal sheets or insulating heat shields, which increases the weight and cost of the plastic fuel tank. A further commercial approach is to use active cooling, which is complex and costly.

Therefore, it is desirable to provide a fuel tank for a vehicle that has a more effective fuel permeation barrier to prevent evaporative emission. It is also desirable to provide a fuel tank for a vehicle having all or part of the fuel tank encased with a film of reflective material to protect the underlying structure in a plastic fuel tank.

SUMMARY OF THE INVENTION

It is, therefore, one object of the present invention to provide a new fuel permeation barrier fuel tank for a vehicle.

It is another object of the present invention to provide a fuel tank encased in all or part of film of reflective material to protect the underlying structure.

To achieve the foregoing objects, the present invention is a fuel permeation barrier fuel tank for a vehicle including a tank shell having a wall formed from a plurality of layers. The layers include at least an inner layer, an outer layer, a fuel permeation barrier layer disposed between the inner layer and the outer layer, and a thermoformable layer disposed adjacent the outer layer to improve permeation resistance and protection against radiant environmental heating of the fuel tank.

One advantage of the present invention is that a fuel permeation barrier fuel tank is provided for a vehicle that has a more effective fuel permeation barrier leading to less evaporative emission. Another advantage of the present invention is that the fuel permeation barrier fuel tank uses a thermoformable film applied to portions of the fuel tank wall improving product quality, by decreasing fuel tank temperature, and improving fuel barrier properties. Yet another advantage of the present invention is that the fuel permeation barrier fuel tank reduces heat and fuel permeation in a plastic fuel tank without adding complexity, weight, or increased cost.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
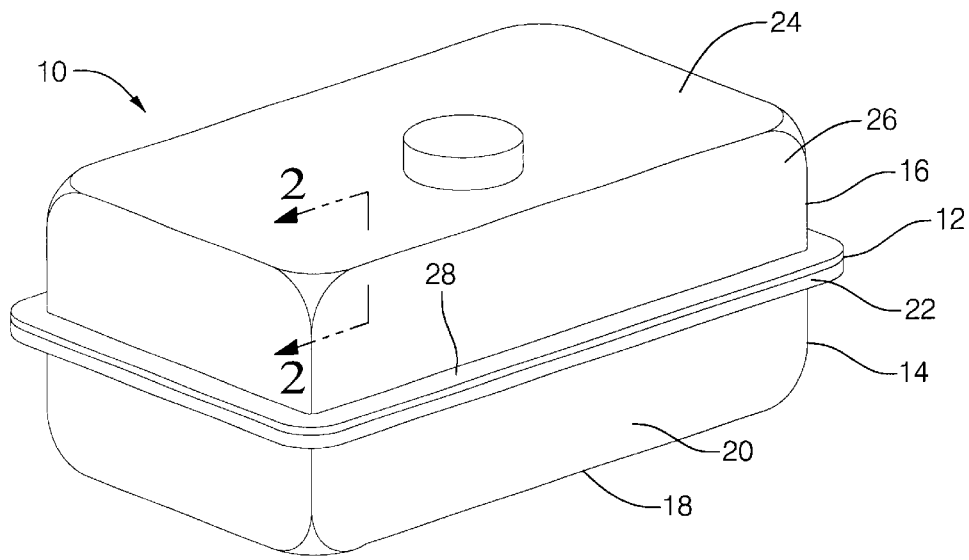
FIG. 1 is a perspective view of a fuel permeation barrier fuel tank, according to the present invention.
Figure 2:
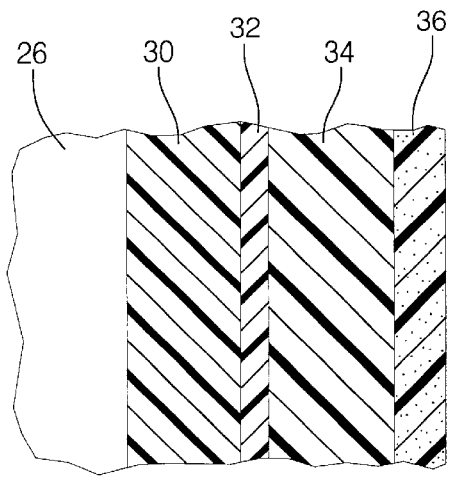
FIG. 2 is a sectional view taken along line 2—2 of FIG. 1.

Referring to the drawings and in particular FIGS. 1 and 2, one embodiment of a fuel permeation barrier fuel tank 10, according to the present invention, is shown for a vehicle (not shown). The fuel permeation barrier fuel tank 10 includes a tank shell 12. In the embodiment illustrated, the tank shell 12 is of a generally rectangular type. The tank shell 12 includes a first or lower half shell 14 and a second or upper half shell 16. The lower half shell 14 has a base wall 18 and a side wall 20 around a periphery of the base wall 18 and extending generally perpendicular thereto. The side wall has a flange 22 extending outwardly and generally perpendicular thereto. The upper half shell 16 has a base wall 24 and a side wall 26 around a periphery of the base wall 24 and extending generally perpendicular thereto. The side wall 26 has a flange 28 extending outwardly and generally perpendicular thereto. The flanges 22 and 28 of the lower half shell 14 and upper half shell 16, respectively, are joined together to form a seam by suitable means such as by thermoforming, compression molding or friction welding. The lower half shell 14 and upper half shell 16 are made of a rigid material such as a thermoformable plastic.

Referring to FIGS. 1 and 2, the fuel permeation barrier fuel tank 10 has the base walls 18,24, side walls 20,26, and flanges 22,28 formed from a plurality of layers 30,32,34,36. The first or inner layer 30 is made from a tough, rigid thermoformable polymer such as a high density polyethylene (HDPE) or similar polyolefin, which is a conventional material known in the art. The first layer 30 has a predetermined thickness of approximately two millimeters (2.00 mm).

The second or fuel permeation barrier layer 32 is made from a barrier polymer as a barrier layer between the inner layer 30 and an outer layer 34. The barrier polymer is a polymer material such as a polyamide or an ethylene-vinyl alcohol (EVOH) copolymer. The fuel permeation barrier layer 32 has a predetermined thickness of approximately 0.1 mm to approximately 1.0 mm. It should be appreciated that the fuel permeation barrier layer 32 may be sandwiched between additional layers of adhesion promoters, polymers, or coatings to improve adhesion to other layers.

The third or outer layer 34 is made from a thermoformable polymer such as a high density polyethylene (HDPE) or similar polyolefin, which is a conventional material known in the art. The outer layer 34 has a predetermined thickness of approximately two millimeters (2.00 mm).

Figure 3:
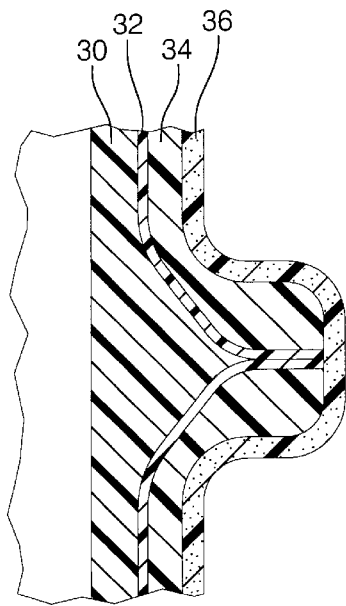
FIG. 3 is a fragmentary elevation view of a seam area of the fuel permeation barrier fuel tank of FIG. 1.

The fourth or thermoformable layer 36 is disposed adjacent either the inner layer 30 or the outer layer 34. In the embodiment illustrated, the thermoformable layer 36 is disposed adjacent the outer layer 34 and is made from a thermoformable film such as a thermoformable decorative paint film which is commercially available from companies such as Avery and Rexam. The thermoformable layer has a base or carrier film, such as a thermoformable fluorocarbon polymer or copolymer, either containing within it or coated on an upper surface thereof with a layer of reflective material, such as flaked aluminum or aluminum flake paint, capable of reflecting radiant heat, and on an undersurface thereof with a layer of an adhesive coating or polymer resin suitable of bonding the film to the tank surface or inner layer 30 and outer layer 34. The thermoformable layer 36 has a predetermined thickness of approximately 1.0 nm. It should be appreciated that the carrier film is of a suitable composition to provide anti-permeation protection to that part of the fuel tank 10 to which it is attached. It should also be appreciated that the thermoformable layer 36 may encapsulate the whole fuel tank 10 or overlap a seam area of the fuel tank 10, as illustrated in FIG. 3, which is a major source of fuel permeation losses. It should further be appreciated that the thermoformable layer 36 may be applied to the outside of either a monolithic polymer tank or one in which the walls contain multiple polymer layers.

In manufacturing the fuel permeation barrier fuel tank 10, the protective film or thermoformable layers 36 can be applied either to the tank sheet stock for the fuel tank 10 prior to forming or to the molded fuel tank 10 itself after it has been formed. Application of the film to the tank sheet stock can be accomplished by laminating the layers, as rolled stock, to the sheet as part of the co-extrusion process. In another embodiment, the film may be applied to the tank sheet stock by laminating the layers in a later process to the cut sheet. In yet another embodiment, the film may be applied to the tank sheet stock by applying the protective layers directly to the cut sheet in a coating process. It should be appreciated that the thermoformable layer 36 may be co-extruded directly onto the upper surface of the tank sheet stock when it is formed.

Application of the thermoformable layers 36 to applicable portion of the fuel tank in its finished state can be accomplished by a vacuum forming process, similar to those used in the manufacture of door inners or instrument panels. It should be appreciated that the protective films or thermoformable layers 36 would be most effective if used to encapsulate the whole fuel tank 10, but would also provide a major contribution to emission control simply by overlapping the seam area of the fuel tank 10. It should also be appreciated that although the protective films are used on a plastic fuel tank, they could be used on other container vessels. It should further be appreciated that the present invention is equally applicable to monolithic tanks, i.e. tanks made from a single material such as HDPE without an internal barrier layer.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel permeation barrier fuel tank for a vehicle comprising:

a tank shell having a wall formed from a plurality of layers;

said layers comprising at least an inner layer, an outer layer, a fuel permeation barrier layer disposed between said inner layer and said outer layer, and a thermoformable layer disposed adjacent said outer layer and comprising a carrier film being a thermoformable fluorocarbon material coated on an upper surface with a layer of reflective material being flaked aluminum to improve permeation resistance and protection against radiant environmental heating of said fuel tank and an adhesive coating or polymer resin bonding said carrier film to said outer layer.

2. A fuel permeation barrier fuel tank as set forth in claim 1 wherein said inner layer and said outer layer are made of a thermoformable polymer material.

3. A fuel permeation barrier fuel tank as set forth in claim 1 wherein said fuel permeation barrier layer is made of either one of a polyamide or an ethylene-vinyl alcohol copolymer.

4. A fuel permeation barrier fuel tank as set forth in claim 1 wherein said thermoformable layer is a thermoformable paint.

5. A fuel permeation barrier fuel tank as set forth in claim 1 wherein said thermoformable layer overlaps a seam area of said fuel tank.

6. A fuel permeation barrier fuel tank as set forth in claim 1 wherein said thermoformable layer encapsulates said fuel tank.

7. A fuel permeation barrier fuel tank as set forth in claim 1 wherein said outer layer has a thickness less than said inner layer.

8. A fuel permeation barrier fuel tank for a vehicle comprising:

a tank shell having a wall formed from a plurality of layers;

said layers comprising at least an inner layer, an outer layer, a fuel permeation barrier layer disposed between said inner layer and said outer layer, and a thermoformable layer comprising a carrier film being a thermoformable fluorocarbon material either containing within or coated on an upper surface with a layer of reflective material being a flaked aluminum disposed adjacent an outer surface of said outer layer to improve permeation resistance and protection against radiant environmental heating of said fuel tank and an adhesive coating or polymer resin bonding said carrier film to said outer layer.

9. A fuel permeation barrier fuel tank as set forth in claim 8 wherein said fuel permeation barrier layer is made of either one of a polyamide material and an ethylene vinyl alcohol (EVOH) material.

10. A fuel permeation barrier fuel tank as set forth in claim 8 wherein said inner layer and said outer layer are made of either one of a high-density polyethylene material and polyolefin material.

11. A fuel permeation barrier fuel tank as set forth in claim 8 wherein said thermoformable layer overlaps a seam area of said fuel tank.

12. A fuel permeation barrier fuel tank as set forth in claim 8 wherein said thermoformable layer encapsulates said fuel tank.

13. A fuel tank for a vehicle comprising:

a tank shell having a wall formed from a plurality of layers;

said layers comprising at least an inner layer, an outer layer comprising either one of a high-density polyethylene material and polyolefin material, a fuel permeation barrier layer comprising an ethylene vinyl alcohol material disposed between said outer layer and said inner layer, and a thermoformable layer comprising a carrier film being a thermoformable fluorocarbon material coated on an upper surface with a layer of reflective material being flaked aluminum disposed adjacent an outer surface of said outer layer to improve permeation resistance and protection against radiant environmental heating of said fuel tank and an adhesive coating or polymer resin bonding said carrier film to said outer layer.

14. A fuel permeation barrier fuel tank for a vehicle comprising:

a tank shell having a wall formed from a plurality of layers;

said layers comprising at least one inner layer and a thermoformable layer disposed adjacent said at least one inner layer and comprising a carrier film being a thermoformable fluorocarbon material coated on an upper surface with a layer of reflective material being flaked aluminum to improve permeation resistance and protection against radiant environmental heating of said fuel tank and an adhesive coating or polymer resin bonding said carrier film to said at least one inner layer.

* * * * *